Feb. 25, 1930.    W. N. BOOTH    1,748,168
WIRE SPOKED VEHICLE WHEEL
Filed July 6, 1926    2 Sheets-Sheet 2
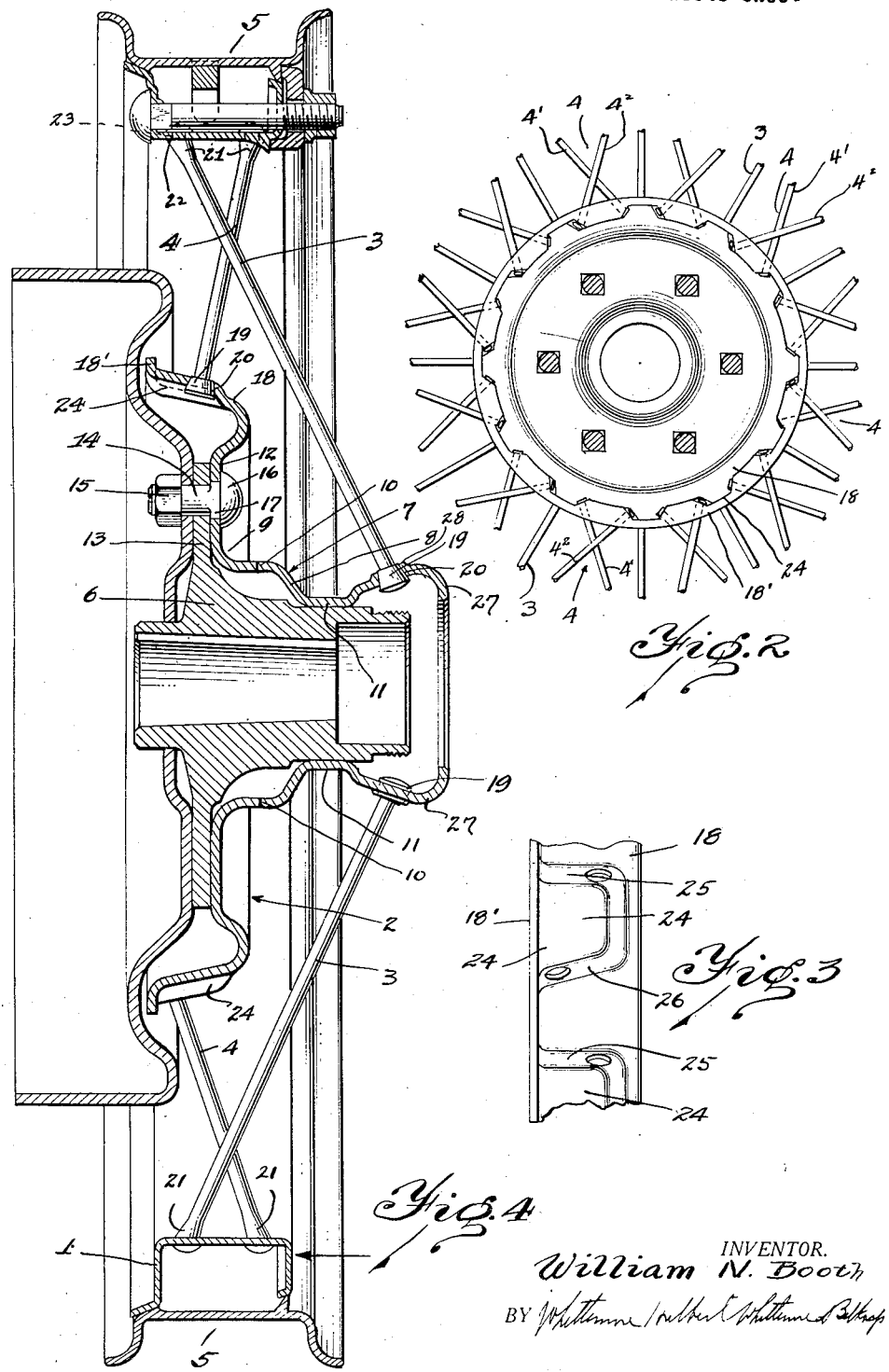
INVENTOR.
William N. Booth
ATTORNEYS.

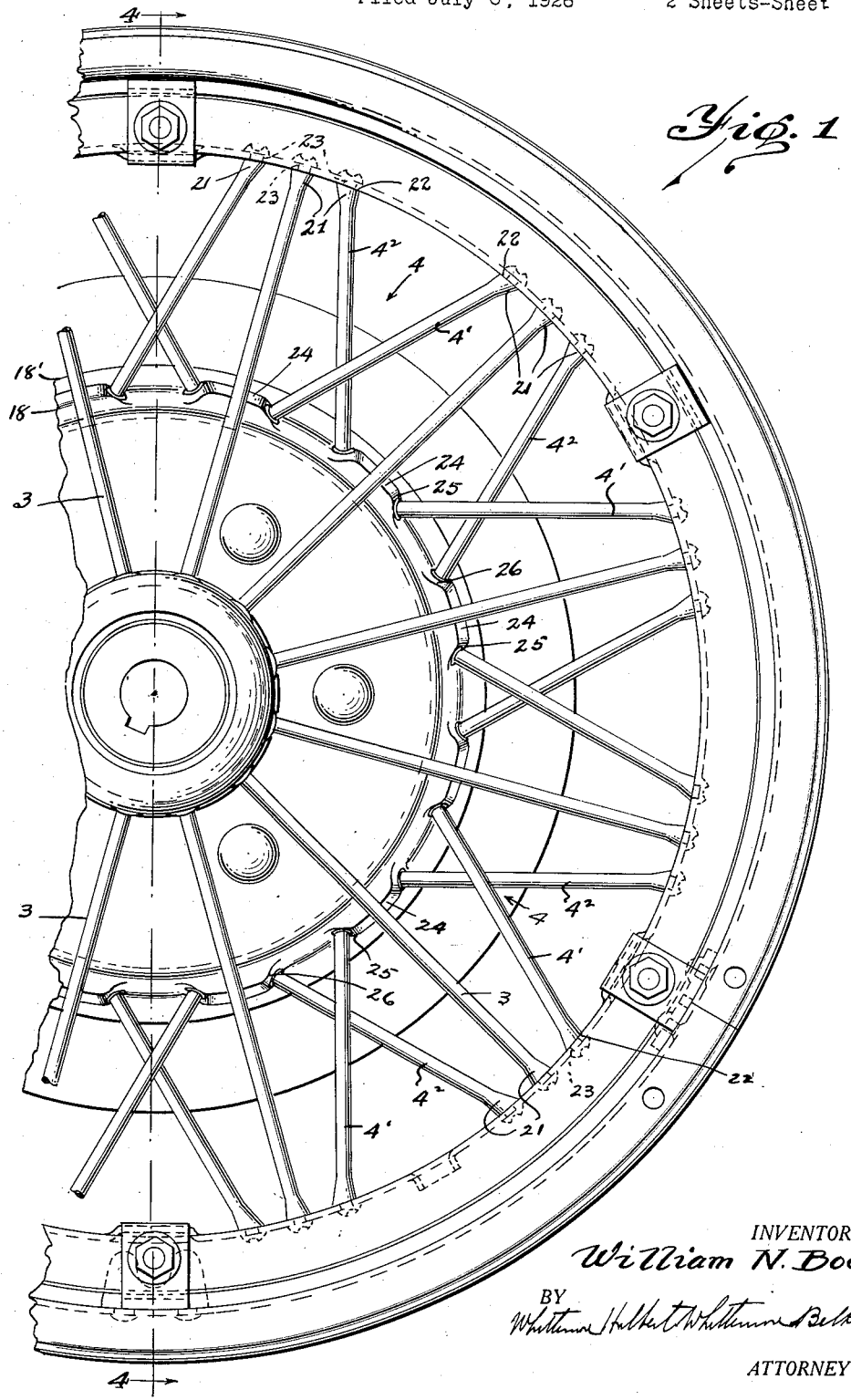

Patented Feb. 25, 1930

1,748,168

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

WIRE-SPOKED VEHICLE WHEEL

Application filed July 6, 1926. Serial No. 120,770.

The invention relates to vehicle wheels and refers particularly to wire spoked vehicle wheels. One of the objects of the invention is the provision of an improved construction of vehicle wheel in which the spokes and rim member are permanently rigidly connected and the spokes and hub are connected to allow the spokes to move longitudinally inward, whereby lateral movement of the rim member relative to the hub will not bend or buckle the spokes. Another object resides in the arrangement and construction of the hub, rim member and spokes whereby they may be readily assembled.

With these as well as other objects in view, the invention resides in the novel features of construction and combinations and arrangements of parts as more fully hereinafter set forth.

In the drawings:—

Figure 1 is a front elevation of a vehicle wheel embodying my invention;

Figure 2 is a rear elevation of a portion thereof, showing the hub;

Figure 3 is an edge elevation of a portion of the hub;

Figure 4 is a cross section on the line 4—4 of Figure 1.

The vehicle wheel has the rim member 1, the hub 2 and the front and rear series of spokes 3 and 4, respectively, which extend between the hub and rim member for suspending the former from the latter. The rim member in the present instance is a sheet-metal channel-shaped felly which is provided with flared seats upon its front and rear side flanges for engagement with the demountable tire carrying rim 5. The hub 2 is formed of the inner section 6 and the outer section or shell 7.

The outer section of the hub is formed of sheet metal of greater thickness than that of the felly and for the purpose of facilitating the manufacture of this outer section it is made up of the front and rear parts 8 and 9, respectively, which are separately or individually drawn to shape and then rigidly secured to each other by means of welding their abutting ends at 10. The front part 8 has the annular depression 11 for slidably fitting upon the inner section 6 of the hub while the rear part 9 has the radial flange 12 for abutting the radial flange 13 fixed upon the inner section of the hub. For securing the inner and outer sections of the hub, I have provided the bolts 14 which extend transversely through the radial flanges 12 and 13 and the nuts 15 threaded upon these bolts, the bolt heads 16 being at the front side of the radial flange 12 and the bolt shanks having polygonal shaped portions 17 for engaging in correspondingly shaped apertures in the radial flange 12 to hold the bolts from rotation.

The outer ends of the front and rear spokes are connected to the base of the felly 1 respectively at the rear and front edges thereof, while their inner ends are connected respectively to the front and rear parts 8 and 9 of the outer section 7 of the hub and at points laterally separated a greater distance than the points of connection of the outer ends. The rear spokes 4 are inclined to the radial planes of the wheel passing through their inner ends while the front spokes 3 extend in the radial planes of the wheel. Furthermore, the rear spokes 4 are arranged in pairs of spokes 4' and 4² crossing each other with the points of crossing equally spaced from the radial planes passing through the front spokes. To provide for the rear spokes crossing each other without bending, the spokes of each pair are connected at laterally or axially offset points to the transverse annular flange 18 upon the radial flange 12 of the outer section of the hub. With this arrangement of spokes sufficient space is provided between the spokes for cleaning the hub and spokes.

For the purpose of providing a vehicle wheel in which lateral movement of the rim member relative to the hub will not buckle or bend the spokes and also for the purpose of forming the wheel so that it may be commercially manufactured at relatively low cost, I have formed at the inner ends of both the front and rear spokes the heads 19 providing in the present instance frusto-conical bearing faces or shoulders 20. I have also formed at the outer ends of the spokes the enlargements 21 providing the shoulders 22 and the tenons 23 of the same diameter as the main portions of the spokes. These tenons 23 extend at an angle to the longitudinal axes of the spokes and the shoulders 22 extend at right angles to the axes of the tenons so that the tenons may extend radially through the base of the felly and the shoulders may properly engage the inner face of the base. Both the heads 19 and enlargements 21 are preferably formed by an upsetting operation with suitable dies so that their respective shoulders 20 and 22 are at exact fixed or predetermined distances apart. The transverse annular flange 18 upon the outer section 7 of the hub is provided with the peripheral bosses 24 which extend transversely of the flange and have arcuate side walls 25 and 26 through which the spokes 4' and 4² of the adjacent pairs of rear spokes respectively extend, these spokes diverging from each other. The spokes 4' extend through the front ends of the arcuate side walls 25 while the spokes 4² extend through the rear ends of the arcuate side walls 26 and to compensate for the lateral separation of the inner ends of these spokes so that they may be made of the same length and interchangeable the transverse annular flange 18 and the bosses 24 are flared outwardly from the radial flange 12. Furthermore, the arcuate side walls 26 diverge outwardly from the radial planes of the wheel passing through their front ends to locate their rear ends peripherally nearer the points of connection of the spokes 4² with the felly than their front ends. The transverse annular flange is preferably reinforced by the radial flange 18' at the rear end thereof. The front end of the outer section 7 of the hub is formed with the annular bead 27 having the peripheral bosses 28 formed on its rear face for engagement with the inner ends of the front spokes 3. The openings formed in the bosses 24 and 28 for the passage of the spokes 4 and 3, respectively, are preferably counter-sunk by suitable dies and punches from their inner sides to provide extended bearings for the bearing faces or shoulders upon the heads of the spokes. By reason of forming the bosses 24 and the annular bead 27 with the bosses 28 the front and rear spokes may be assembled in the wheel to directly transmit the stresses from the hub to the felly in straight lines. Also clearance is provided for the heads of the spokes.

In assembling, the front and rear spokes 3 and 4 are respectively inserted through the openings in the bosses 28 and 24 of the outer section 7 of the hub from the inside thereof, these openings being sufficiently large to permit the passage of the spoke enlargements 21 therethrough. The spoke tenons 23 are engaged in their correct openings in the base of the felly 1. An expanding arbor is inserted into the outer section of the hub and the inner ends of the rear spokes 4 are forced outwardly bringing their heads 19 into firm engagement with the arcuate side walls of the bosses and with a force sufficient to place the metal forming these bosses under stress. The felly 1 is forced laterally in the direction indicated by the arrow in Figure 4 to bring the shoulders 22 of these spokes into firm engagement with the die-fashioned bearings upon the base of the felly after which the outer ends of the tenons 23 are peened or riveted over against the outer face of the base during which time suitable gripping jaws surround the spokes adjacent to their enlargements 21 to hold these spokes from buckling. After the rear spokes have been secured, the inner ends of the front spokes 3 are forced outwardly by the expanding arbor to bring their heads into firm engagement with the bosses 28 with a force sufficient to place the metal forming these bosses under stress. The rim member 1 is forced laterally in a direction opposite to that indicated by the arrow in Figure 4 to bring the shoulders at the outer ends of these spokes into firm engagement with the base of the felly, after which the outer ends of the tenons are peened or riveted over against the outer face of the base, during which the gripping jaws also surround these spokes adjacent to their enlargements to hold the spokes from buckling. With this arrangement, the shoulders 22 upon the spoke enlargements 21 serve in positioning the felly or rim member concentrically of the outer section or shell of the hub. When the felly 1 is forced in the direction opposite to that indicated by the arrow in Figure 4, the rear spokes are placed under abnormal tension and the portions of the base of the felly surrounding the tenons of these spokes are placed under stress and resiliently flex to a greater extent than the portions of the arcuate side walls of the bosses surrounding the inner ends of these spokes. After the lateral pressure is removed from the felly and the expanding arbor is removed from the outer section of the hub the portions of the felly and outer hub section forming the annular bearings for the spoke shoulders flex back toward their original or normal positions and the rim returns in the direction of the arrow shown in Figure 4 to a position where the tension of the front spokes equals that of the rear spokes, all of the spokes then being under tension.

From the above description it will be seen that I have provided a wire spoked vehicle wheel which is so constructed that buckling or bending of the spokes is avoided upon lateral movement of the rim relative to the hub, owing to the fact that the spokes may move inwardly relative to the outer section or shell of the hub. However, the spokes being rigidly connected to the rim and normally connected to the outer section or shell of the hub to place the portions of the rim and outer section or shell of the hub through which these spokes pass under tension, the wheel functions in a highly satisfactory manner and has no parts which will work loose. It will also be seen that the wheel construction enables the use of straight spokes and that the outer section or shell of the hub can be readily and cheaply manufactured.

What I claim as my invention is:

1. In a suspension wire wheel, the combination of hub and rim members, a plurality of spokes inclined to the radial planes of the wheel passing through their inner ends and connecting the hub and rim members, each of said spokes having one end fixed in respect to the rim member and its opposite end extending through and movable in respect to the hub member, the hub and rim engaging portions of each of said spokes arranged at a fixed or predetermined distance apart.

2. In a suspension wire wheel, the combination of hub and rim members, a plurality of spokes connecting the hub and rim members, each of said spokes having one end fixed in respect to the rim member and its opposite end extending through and movable in respect to the hub member, the hub and rim engaging portions of each of said spokes arranged at a fixed or predetermined distance apart.

3. In a suspension wire wheel, the combination of hub and rim members, a plurality of spokes inclined to the radial planes of the wheel passing through their inner ends and connecting the hub and rim members, each of said spokes having one end fixed in respect to one of the hub and rim members and its opposite end extending through and movable in respect to the other of the hub and rim members.

4. In a suspension wire wheel, the combination of hub and rim members, a plurality of spokes inclined to the radial planes of the wheel passing through their inner ends and connecting the hub and rim members, each of said spokes having one end fixed in respect to one of the hub and rim members and its opposite end extending through and movable in respect to the other of the hub and rim members, the hub and rim engaging portions of each of said spokes arranged at a fixed or predetermined distance apart.

5. In a suspension wire wheel, the combination of hub and rim members, a plurality of spokes connecting the hub and rim members, each of said spokes having one end fixed in respect to one of the hub and rim members and its opposite end extending through and movable in respect to the other of the hub and rim members, the hub and rim engaging portions of each of said spokes arranged at a fixed or predetermined distance apart.

6. In a suspension wire wheel, the combination of hub and rim members, a plurality of spokes connecting the hub and rim members, each of said spokes having preformed shoulders at a fixed or predetermined distance apart for engaging the hub and rim members, each of said spokes being fixed in respect to one of the hub and rim members and extending through and movable in respect to the other of the hub and rim members.

7. In a suspension wire wheel, the combination of hub and rim members, a plurality of spokes inclined to the radial planes of the wheel passing through their inner ends and connecting the hub and rim members, each of said spokes having preformed shoulders at a fixed or predetermined distance apart for engaging the hub and rim members, each of said spokes being fixed in respect to one of the hub and rim members and extending through and movable in respect to the other of the hub and rim members.

8. In a suspension wire wheel, the combination of hub and rim members, a plurality of spokes connecting the hub and rim members, each of said spokes having preformed enlargements providing shoulders at a fixed or predetermined distance apart for engaging the hub and rim members, each of said spokes being fixed in respect to one of the hub and rim members and extending through and movable in respect to the other of the hub and rim members.

In testimony whereof I affix my signature.

WILLIAM N. BOOTH.